US006993030B2

(12) United States Patent
Caves et al.

(10) Patent No.: US 6,993,030 B2
(45) Date of Patent: Jan. 31, 2006

(54) AAL2 NEGOTIATION PROCEDURE

(75) Inventors: Keith Caves, Sawbridgeworth (GB); Simon Daniel Brueckheimer, London (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 10/876,905

(22) Filed: Jun. 25, 2004

(65) Prior Publication Data

US 2004/0228348 A1 Nov. 18, 2004

Related U.S. Application Data

(63) Continuation of application No. 09/140,865, filed on Aug. 27, 1998, now Pat. No. 6,788,691.

(51) Int. Cl.
*H04L 12/56* (2006.01)
(52) U.S. Cl. .............................. 370/395.3; 370/395.64; 370/469
(58) Field of Classification Search ............. 370/395.1, 370/474, 469, 395.6, 395.64
See application file for complete search history.

(56) References Cited

U.S. PATENT DOCUMENTS 5,471,645 A * 11/1995 Felix .......................... 455/516
5,907,542 A * 5/1999 Kuehnel et al. ............. 370/331
5,999,532 A * 12/1999 Terasaki .................... 370/395.3
6,041,054 A * 3/2000 Westberg .................... 370/389
6,049,530 A * 4/2000 Petersen et al. ............. 370/248
6,128,659 A * 10/2000 Subblah et al. .............. 709/225
6,137,798 A * 10/2000 Nishihara et al. ........... 370/392
6,219,339 B1 * 4/2001 Doshi et al. ................ 370/235
6,665,300 B1 * 12/2003 Caves et al. ............. 370/395.2

* cited by examiner

*Primary Examiner*—Alpus H. Hsu
(74) *Attorney, Agent, or Firm*—Barnes & Thornburg

(57) ABSTRACT

There is disclosed a method for establishing a plurality of ATM adaption layer type 2 channels between interworking functions across a single ATM virtual channel connection. Within each interworking function there are a system management layer entity an ANP layer management identity and a protocol stack. The ANP layer management entities are further sub-divided into a series of functional blocks comprising: Originating procedures, Terminating procedures and Status Record entity. The Status Record entity records whether each AAL2 channel amongst the plurality of AAL2 channels is assigned/unassigned or activated/de-activated. A new AAL2 channel is established between interworking functions when a System Management entity sends in Assign_Request primitive to ANP layer management entity requesting an available AAL2 channel. The status record entity within ANP layer management entity is interrogated and an available AAL2 channel is identified. A robust set of messages are exchanged between the ANP layer management entities indicating that an AAL2 channel is available and confirming or denying the connection.

46 Claims, 9 Drawing Sheets

| CID | |
|---|---|
| 1 | Assigned/Unassigned |
| 2 | |
| ⋮ | ⋮ |
| 230 | Activated/Deactivated |
| ⋮ | ⋮ |
| 240 | |
| ⋮ | ⋮ |
| 256 | |

Pre-assigned AAL2 channels

AAL2 NEGOTIATION PROCEDURE

RELATED APPLICATION

This application is a continuation of U.S. patent application Ser. No. 09/140,865, filed Aug. 27, 1998 now U.S. Pat. No. 6,788,691.

FIELD OF THE INVENTION

The invention relates to digital communications networks, and particularly, although not exclusively to an arrangement and method for enabling a plurality of channels to occupy a single asynchronous transfer mode (ATM) connection.

BACKGROUND TO THE INVENTION

The known asynchronous transfer mode (ATM) transmission technique is a modern telecommunications switching technique which is able to switch connections for a wide range of different data types at a wide range of different bit rates. ATM technology provides a flexible form of transmission which allows various types of service traffic data, eg. voice data, video data, or computer generated data to be multiplexed together onto a common physical means of transmission, Currently, several trends are encouraging the widespread introduction of ATM; for example the availability of high speed, low error rate communication links between switching centers, an availability of technology to digitize video and speech, and pressure to reduce operating costs by integrating previously separate telephony and data network. ATM technology allows speech data, video and inter-computer data to be carried across a single communications network. The information carried in each of these services is reduced to digitized strings of numbers which are transmitted across such a communications network from point to point.

Referring to FIG. 1 herein, there is illustrated schematically a pair of known interworking functions 101 and 102 connected by an ATM virtual channel connection (ATM VCC) 103 across an ATM network 100. FIG. 1 illustrates a pair of interworking functions which may be residing at a pair of distinct telecoms resources eg switches, cross connects, comprising processing means and memory means. It will be understood by those skilled in the art that a plurality of interworking functions may be interconnected over a plurality of ATM VCC. Incoming to first interworking function 101 are, for example, a plurality of digitized voice signals multiplexed together using the E1 or T1 mutiplexing systems. First and second interworking functions 101 and 102 are configured to convert data arriving in a plurality of forms and conforming to a plurality of different data standards into a form suitable for transmission over ATM VCC 103 across ATM network 100. Interworking functions 101 and 102 are also configured to perform conversion of data sets across ATM network 100 back into a plurality of different data standards. Each of these incoming channels may carry data at a bit rate of 64 kilobits per second (kbits/s).

There is a financial cost associated with leasing sufficient bandwidth between interworking functions 101 and 102 to transmit a plurality of uncompressed 64 kbits/s channels down a single ATM virtual circuit 103. Therefore, it is known to apply a range of different data compression techniques in order to make more efficient use of the available band width. For example, the known G series data compression techniques can be used to compress streams of data having a bit rate of 64 kbits/s down to bit rates of 40 kbits/s or 8 kbits/s. In addition, speech activity detection (SAD) techniques can be used to suppress pauses in speech data allowing other data to be inserted in the gaps. After compression, there may exist a plurality of compressed 8 kbits/s data to be transferred between interworking functions 101 and 102 across ATM virtual channel 103 via ATM network 100. The plurality of compressed channels of data may represent a plurality of calls between a plurality of users.

Referring to FIG. 2 herein, there is illustrated schematically first and second interworking functions 101, 102 represented as a set of functional layers. Each interworking function comprises the following protocol stack of functional layers:

a Service Specific Conversion Sub-layer (SSCS) 201 into which compressed voiced data are input and output;

a Common Part Sub-layer (CPS) 202;

an ATM Sub-layer 203; and a Physical Sub-layer 204.

The set of functional layers 201 to 204 are well known in the art. Each functional layer within the protocol stack is configured to exchange information with the functional layer above it and the functional layer below it. The exchange of information between functional layers within the protocol stack enables each functional layer to provide a service for the functional layer immediately above it. Each functional layer can be considered to exchange information directly with the same functional layer within a protocol stack residing within a distant interworking function across a virtual channel. The exchange of information between interworking functions 101 and 102 is actually effected by the exchange of information across a physical connection between physical sub-layers 204 and 208. Compressed voice data which are input into the interworking function 101 by the Service Specific Conversion Sub-layer 201 are transferred across an ATM network to the remote second interworking function 102 which comprises a similar protocol stack to interworking function 101. The output of Service Specific Conversion Sub-layer 205 of first interworking function 102 is compressed voice data.

Whilst transmission of compressed voice data is shown in one direction in FIG. 1, the protocol stacks are bi-directional and transmission can occur in both directions between first and second interworking functions 101, 102.

In FIG. 2 herein there is illustrated a single Service Specific Conversion Sub-layer 201 associated with interworking function 101. In a real network there may be a plurality of such Service Specific Conversion Sub-layers receiving a plurality of compressed voice data channels. The Common Part Sub-layer 202 is configured to receive a plurality of compressed voice data channels from the plurality of Service Specific Conversion Sub-Layers and multiplex the plurality of compressed voice data channels together. The combination of Service Specific Conversion Sub-layers 201 and Common Part Sub-layer 202 in interworking function 101 are also known in the prior art as ATM Adaption Layer Type 2 (AAL2).

In order to make best use of the available band width over a single ATM. VCC it is known to have a plurality of channels carrying a plurality of, for example, compressed voice data channels. In order to be able to carry a plurality of separate streams of digital data across a network using a plurality of ATM AAL 2 channels over a single ATM virtual channel connection (VCC), there is a need to be able to identify individual ATM AAL 2 channels at both interworking functions.

SUMMARY OF THE INVENTION

Specific embodiments and methods according to the present invention aim to facilitate the establishment of a plurality of ATM AAL2 channels across a single ATM virtual circuit, thereby providing a more efficient use of available band width in communications networks.

According to a first aspect of the present invention there is provided a method of communicating a plurality of AAL2 channels over an ATM virtual channel connection between first and second communications entities, said method comprising the steps of:

maintaining a stored record of a plurality of channel identifiers relating to a plurality of AAL2 channels; and establishing an AAL2 channel on a virtual channel connection by sending and receiving a plurality of messages over an AAL2 channel between said first and second communication entities, wherein said messages operate on said stored record of channel identifiers to modify said channel identifiers into an assigned state indicating an AAL2 channel has been assigned to a virtual channel connection, or an unassigned state, indicating an AAL2 channel is unassigned to a virtual channel connection.

The invention includes a method of establishing an AAL2 channel over an ATM virtual channel connection comprising the steps of:

maintaining a stored record of a plurality of channel identifiers relating to a corresponding plurality of AAL2 channels; and modifying a status of said stored channel identifier indicating a corresponding said AAL2 channel is assigned to a virtual channel connection.

Said status may be modified in response to a set of primitive messages received from a system management means.

The invention includes a method of de-establishing an AAL2 channel from an ATM virtual channel connection, said method comprising the steps of:

maintaining a stored record of a plurality of channel identifiers relating to a plurality of AAL2 channels; and modifying a status of a said stored channel identifier to indicate a said corresponding AAL2 channel is unasssigned to a virtual channel connection.

The status may be modified in response to a set of primitive messages received from the system management means.

The status may be modified in response to at least one peer to peer message received from a communications network.

According to a second aspect of the present invention there is provided an ATM communications entity capable of communicating a plurality of AAL2 channels over a single ATM virtual channel connection (VCC), said device comprising:

means for storing a plurality of records describing a status of a plurality of AAL2 channel identifiers;

means for generating a set of messages operating on said stored channel identifier records;

means for generating a plurality of originating procedure messages for creating a plurality of AAL2 channels; and means for generating a plurality of terminating procedure messages complementary to the originating procedure messages for creating a plurality of AAL2 channels; and means for generating a plurality of originating procedure messages for releasing a plurality of AAL2 channels; and means for generating a plurality of terminating procedure messages complementary to the originating procedure messages for releasing a plurality of AAL2 channels.

According to a third aspect of the present invention there is provided a method of assigning a plurality of AAL2 channels to an ATM virtual channel connection (VCC), said method comprising the steps of:

to set up a said AAL2 channel;

generating an assignment request message for sending to an ATM communications entity to request assignment of an AAL2 channel in response to said request message;

receiving a first assignment confirmation message confirming receipt of said assignment request message; and sending a second assignment confirmation message for confirming receipt of said first assignment confirmation message.

Preferably the method further comprises the steps of:

if said first assignment confirmation message is not received within a predetermined period, sending a second assignment request message to request assignment of an AAL2 channel in response to said second assignment request message.

Preferably the method further comprises the step of:

if neither said assignment request message nor said second assignment confirmation message is received within a predetermined period after the sending of said first assignment confirmation message, the assignment of said AAL2 channel to said ATM VCC is assumed to be complete.

According to a fourth aspect of the present invention there is provided a method of releasing an AAL2 channel carried over an ATM virtual channel connection (VCC) said method comprising the steps of:

sending a first release request message, said first release request message requesting disconnection of an AAL2 channel from a virtual channel connection;

receiving a first release confirm message confirming release of a said AAL2 channel; and sending a second release confirm message confirming receipt of said first release confirm message.

Preferably, the method further comprises the step of:

if said first release confirm message is not received within a predetermined time, sending a second release request message requesting release of said AAL2 channel.

Preferably the method further comprises the step of:

if neither a release request message nor a release confirm message is received within a predetermined time after sending said second release confirm message, the release of said AAL2 channel is assumed to be complete.

The invention includes a method for transmitting a plurality of streams of digital data using at least one of a plurality of channels over a communications network, said method comprising the steps of:

identifying an unused channel amongst said plurality of channels, wherein said plurality of channels are configurable to connect a transmitting function to a receiving function;

sending a message from said transmitting function to said receiving function requesting to use said identified channel to connect said transmitting function to said receiving function;

sending a message from said receiving function to said transmitting function confirming that said identified channel is available to transmit said digital data between said transmitting function and said receiving function;

exchanging said stream of digital data between said transmitting function and said receiving function using said identified channels; and releasing said identified used channel.

Preferably said step of identifying an unused channel amongst said plurality of channels comprises the steps of:

sending a first message from a first functional block of said transmitting function to a second functional block of said transmitting function requesting an unused channel;

sending a second message from said second functional block of said transmitting function to a third functional block of said transmitting function to identify an unused channel amongst said plurality of channels and to mark as assigned said unused channel;

sending a third message from said second functional block of said transmitting function to said first functional block of said transmitting function confirming that said unused channel is available.

Preferably said step of sending a message from a transmitting function to a receiving function comprises sending a message from a second functional block within said transmitting function to a corresponding second functional block within said receiving function.

Preferably said step of sending a message from said receiving function to said transmitting function confirming said identified channel, comprises the steps of:

sending a fourth message from said corresponding second functional block within said receiving function to a first functional block within said receiving function said message identifying said unused channel;

sending a fifth message from said first functional block within said receiving function to said second functional block within said receiving function accepting said unused channel;

sending a sixth message from said second functional block of said receiving function to a third functional block within said receive function to mark as assigned said unused channel;

sending a seventh message from said second functional block of said receiving function to said second functional block of said transmitting function confirming that said identified unused channel is acceptable; and sending an eighth message from said second functional block of said transmitting function to said first functional block of said transmitting function confirming that said identified unused channel is acceptable.

Preferably said step of releasing said identified used channel comprises the steps of:

sending a ninth message from said first functional block of said transmitting function to said second functional block of said transmitting function requesting to release said identified used channel;

sending a tenth message from said second functional block of said transmitting function to said third functional block of said transmitting function requesting to mark said identified used channel as unassigned;

sending an eleventh message from said second functional block of said transmitting function to said corresponding second functional block of said receiving function requesting to release said identified used channel;

sending a twelfth message from said second functional block of said receiving function to said first functional block of said receiving function requesting to release said identified used channel;

sending an thirteenth message from said first functional block of said receiving function to said second functional block of said receiving function confirming release of said identified used channel;

sending a fourteenth message from said second functional block of said receiving function to said third functional block of said receiving function requesting to mark said identified used channel as unassigned;

sending a fifteenth message from said second functional block of said receiving function to said second functional block of said transmitting function confirming release of said identified used channel; and sending a sixteenth message from said second functional block of said transmitting function to said first functional block of said transmitting function confirming release of said identified used channel.

Preferably said plurality of channels comprise a plurality of ATM adaption layer type 2 channels.

A said transmitting and said receiving function may each comprise an interworking function.

The invention includes a network comprising:

a plurality of physical resources comprising a plurality of processors, and a plurality of memory means;

a means for communicating between said plurality of physical resources;

a plurality of functions residing at said plurality of processors and said plurality of memory means, wherein at least one function of said plurality of functions is sub-divided into a first set of functional blocks;

at least one functional block of said first set of functional blocks is sub-divided into a second set of functional blocks, wherein members of said first set of functional blocks are configurable to exchange a first set of messages with members of said second set of functional blocks; and members of said second set of functional blocks within a first function residing at a first set of processors and a first set of memory means are configurable to exchange a second set of messages with corresponding members of a second set of functional blocks within a second function residing at a second set of physical resources and a second set of memory means.

Preferably said communicating means comprises an ATM adaption layer type 2 virtual channel connection.

Said second set of functional blocks within said first function and said second set of functional blocks within said second function may comprise:

a means for originating a plurality of channels between said first function and said second function;

a means for terminating a plurality of channels between said first function and said second function; and a means for storing a status of a channel of said plurality of channels between said first function and said second function, wherein said status of a channel indicates whether said channel is in use.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE BEST MODE FOR CARRYING OUT THE INVENTION

There will now be described by way of example the best mode contemplated by the inventors for carrying out the invention. In the following description numerous specific details are set forth in order to provide a thorough understanding of the present invention. It will be apparent however, to one skilled in the art, that the present invention may be practiced without limitation to these specific details. In other instances, well known methods and structures have not been described in detail so as not to unnecessarily obscure the present invention.

ATM Adaptation Layer Type 2 (AAL2) allows a user to have multiple AAL connections per ATM connection. This is achieved by multiplexing "packets" of data in the common part sub-layer (CPS). A number of packets can be placed within an ATM cell. The default length for user data in a CPS packet is up to 45 octets—with a 3 octet CPS packet header. This guarantees that the full CPS packet will be no longer than 48 octets and can fit into the payload of a single ATM cell. An AAL2 CPS packet comprises a channel identifier (CID), a length indicator (LI), a user to user identification (UUI), and a header error control (HEC) as is known in the prior art. The specification for AAL2 can be found in ITU-T I.363.2, B-ISDN ATM Adaptation Layer Type 2 Specification, Toronto, September 1997.

Figure 1:
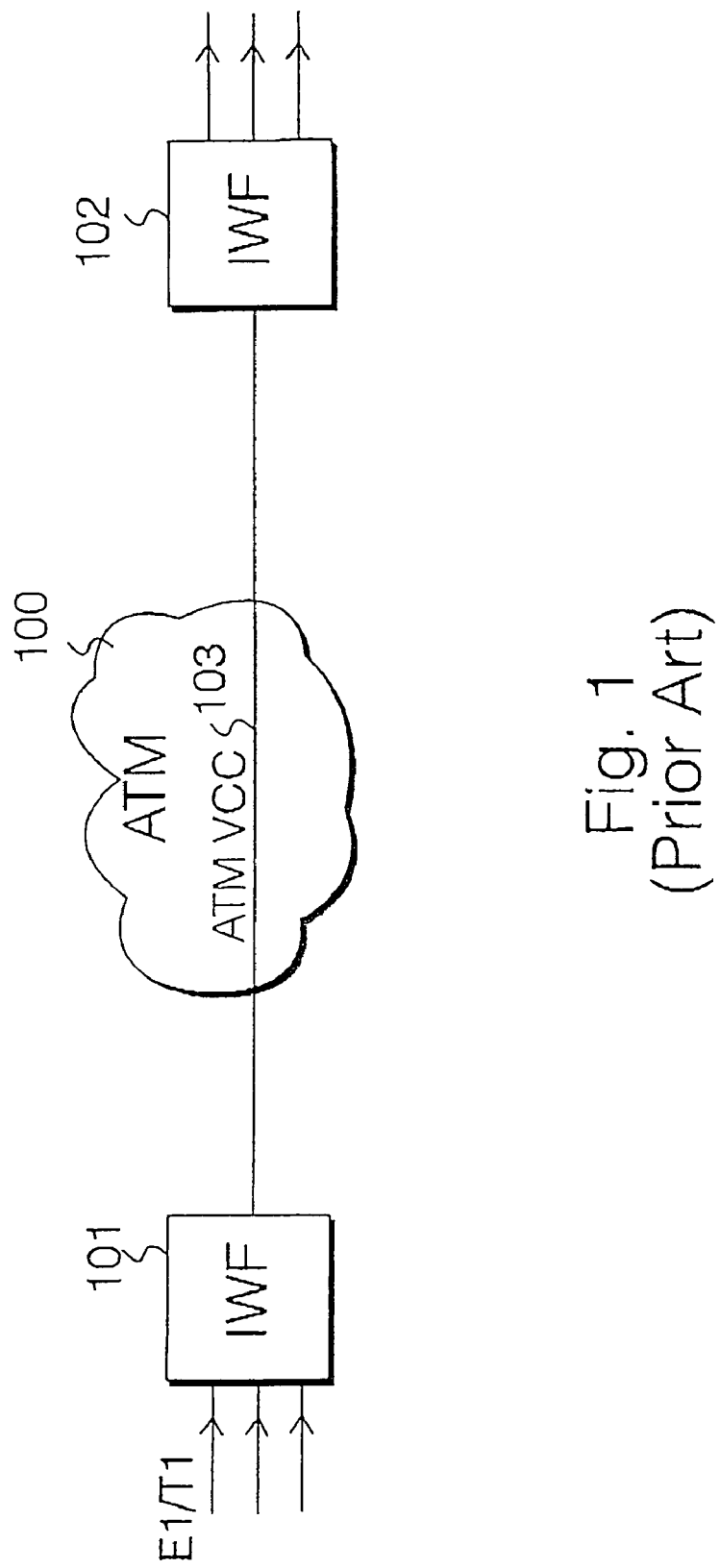
FIG. 1 illustrates schematically a pair of known interworking functions connected by an ATM virtual channel connection (ATM VCC) across an ATM network.
Figure 2:
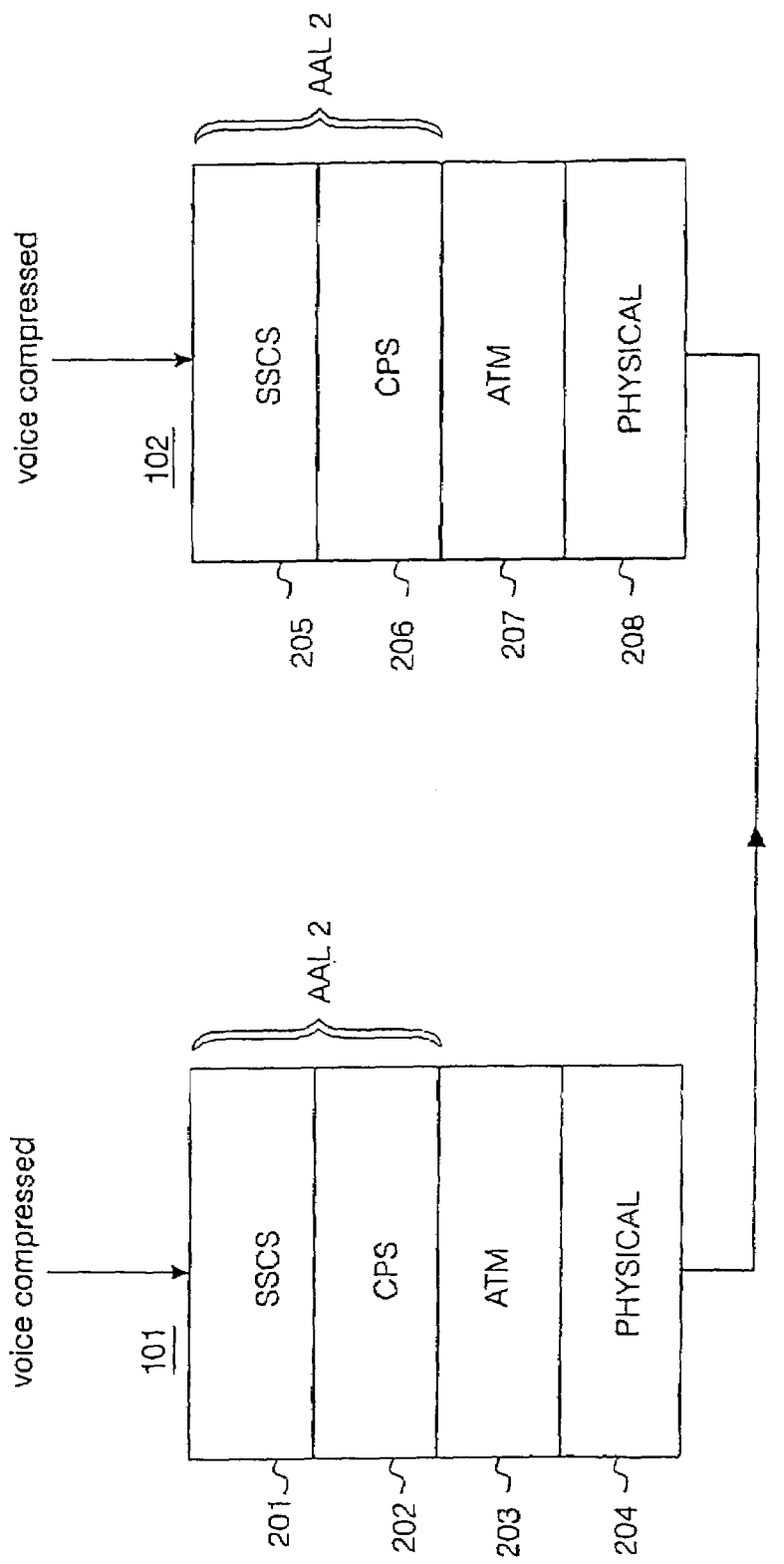
FIG. 2 illustrates schematically the pair of known interworking functions represented as a set of functional layers.
Figure 3:
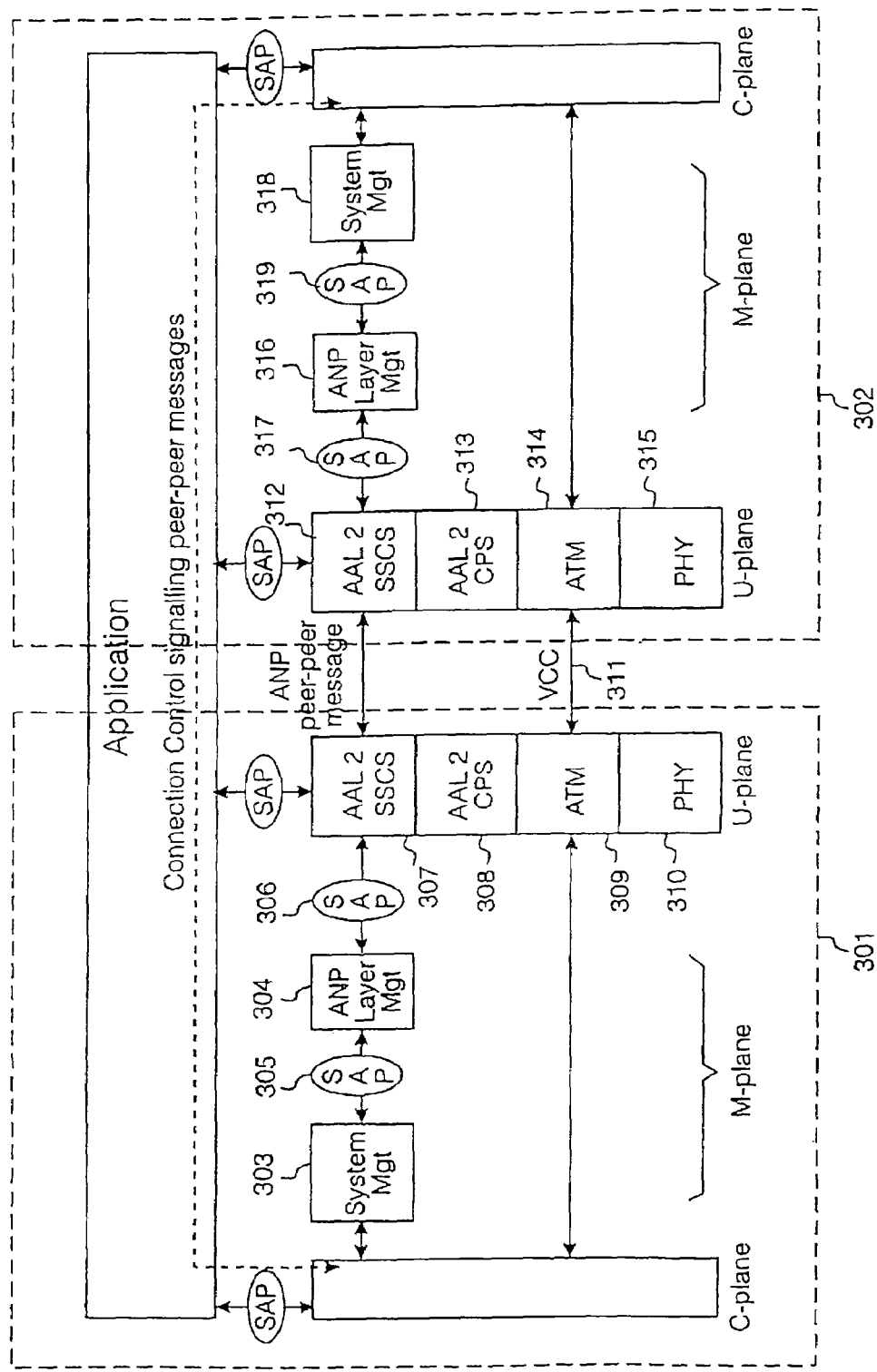
FIG. 3 illustrates schematically functional blocks within first and second interworking functions according to a first specific implementation of the present invention.

Referring to FIG. 3 herein, there are shown a set of functional blocks, which are also known as entities herein, comprising first and second interworking functions 301 and 302 according to a first specific implementation of the present invention. Such entities may reside at first and second telecoms resources, eg switches, connects, routers. Each functional bock comprises a means for performing a function, which in the best mode herein are implemented as application specific integrated circuits (ASICS), or by data processors operating in accordance with algorithms stored in electronic form in electronic memories. It will be understood by those skilled in the art that only those functional blocks concerned with the control of AAL2 channels between interworking functions 301 and 302 are shown in FIG. 3. In order to carry a plurality of separate streams of data across a network, using a plurality of ATM AAL2 channels over a single ATM virtual channel connection (VCC), individual ATM AAL2 channels need to be identified at both first and second interworking functions. The channel identifier (CID) of each AAL2 channel is used for this purpose as follows:

At first interworking function 301, System Management entity 303 exchanges information with ANP layer management entity 304 via a service access point (SAP) 305. The ANP layer management entity 304 exchanges information with the protocol stack comprising functional layers 307 to 310. Information is exchanged across service access points by means of the exchange of predefined sets of messages. The predefined sets of messages are known herein as 'primitives'.

System Management entity 303 is configured to control inputs to ANP layer management entity 304 which in turn controls the protocol stack 307–310 which controls the connections which enables a plurality of AAL2 channels to be created on a single ATM virtual channel connection 311.

Second interworking function 302 is constructed similarly to first interworking function 301 and comprises a service specific convergence sub-layer 312; a common part sub-layer 313; an ATM layer 314; a physical layer 315 connected to physical layer 310 of the first interworking function 301; a second ANP layer management entity 316 connected to service specific convergence sub-layer 312 via a service access point 317; and a second system management entity 318 connected to second ANP management entity 316 via a service access point 319.

Figure 4:
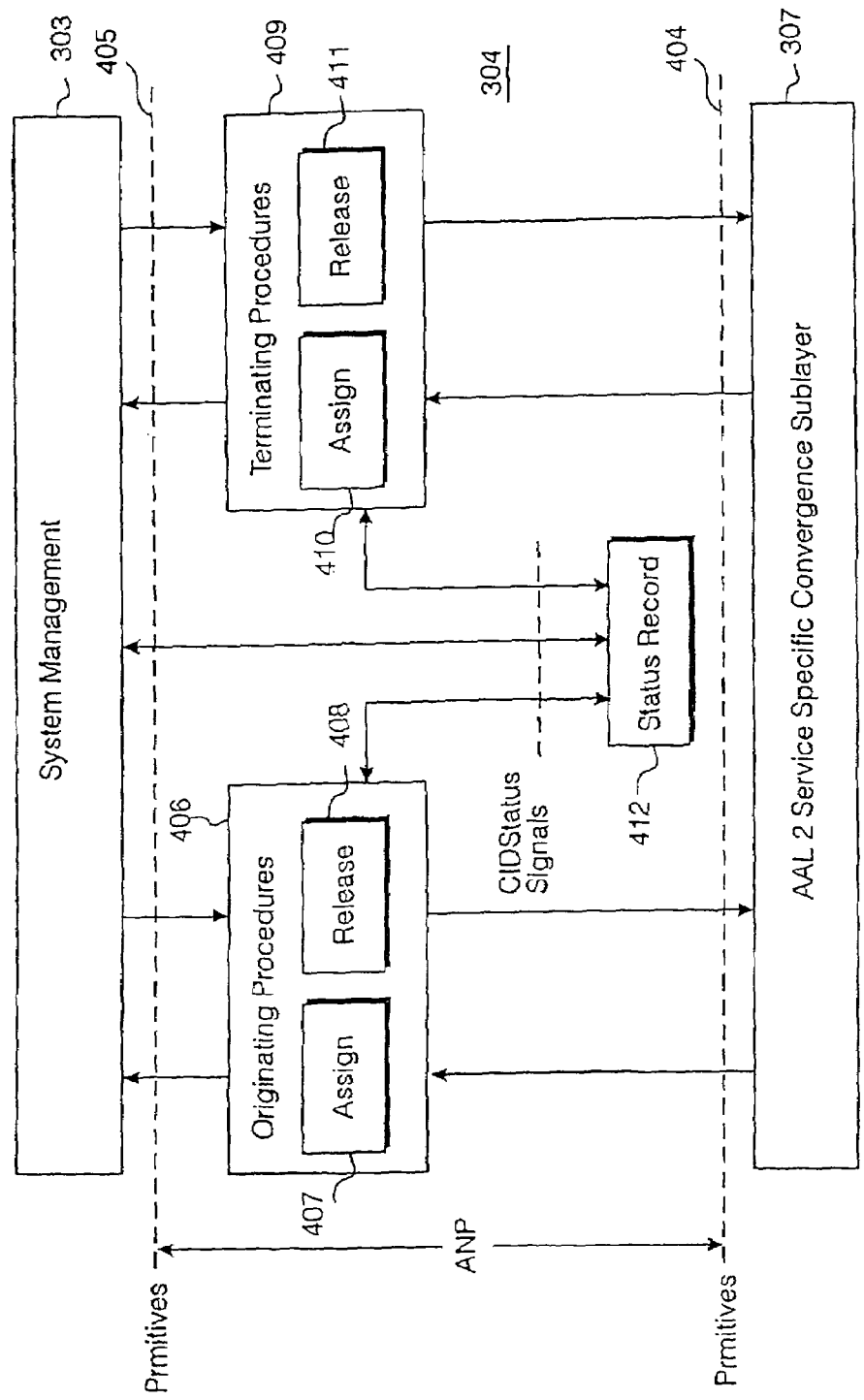
FIG. 4 illustrates schematically, in more detail, the functional blocks within an ANP layer management according to the first specific implementation of the present invention.

Referring to FIG. 4 herein, there is illustrated an architecture of ANP layer management entity 304 according to the first specific implementation of the present invention. The ANP layer management entity is organized and configured into a plurality of functional means, which carry out a set of logical operations. A similar set of logical operations are provided at second ANP layer management entity 316. A System Management entity 303 exchanges information across service access point 305 with the ANP layer management entity 304 by means of a set of primitives. Each primitive within the set of primitives for communication between the ANP layer management entity 304 and the System Management entity 303 contains parameters which are assigned values when the primitive is used. The primitives exchanged between the System Management entity 303 and the ANP layer management entity 304 are summarized in Table 1 herein. The following parameters are defined for use with the primitives:

Channel identifier (CID)—the CID parameter indicates a CID value for the AAL2 channel being used;

Connection parameters (Conn_Parms)—this parameter is used with primitives that deal with AAL2 channels. It contains parametric elements necessary to configure the AAL2 channel including details of any voice encoding used;

Cause—the cause parameter is used with the Reject, Release and Fault primitives to indicate the reason for a CID assignment rejection, a CID release, or a fault indication;

TransactionID—the TransactionID parameter is used with all primitives except for 'Activate' and 'Deactivate'. Its purpose is to associate a current transaction with a given call between users across ATM VCC 311, so that any concurrent transactions may be distinguished. Its use is local to a user of the ANP layer management entity 304.

TABLE 1

| Primitive Generic Name | Type | | | |
|---|---|---|---|---|
| | Request | Indication | Response | Confirm |
| Assign | TransactionID Conn_Parms | TransactionID CID | TransactionID CID | TransactionID CID |
| Reject | (Note 1) | TransactionID CID Cause | TransactionID CID Cause | (Note 1) |
| Release | TransactionID CID Cause | TransactionID CID Cause | TransactionID CID | TransactionID CID |
| Ready-for-Use | (Note 1) | CID TransactionID | (Note 1) | (Note 1) |
| Fault | (Note 1) | TransactionID Cause | (Note 1) | (Note 1) |
| Activate | CID | CID | CID | CID |
| Deactivate | CID | CID | CID | CID |

Note 1:
This primitive not defined

According to the best mode described herein., operation of the ANP layer management entity is subdivided into a set of 'Originating' procedures 406 and a set of 'Terminating' procedures 409. The Originating procedures 406 are further subdivided into two further functional blocks 'Assign' 407 and 'Release' 408. The Terminating procedures 409 are subdivided into functional blocks 'Assign' 410 and 'Release' 411.

The Originating procedure 'Assign' 407 is invoked when the local system management entity within an interworking function requests the assignment of an AAL2 channel identifier (CID) to a particular AAL2 connection. The Originating procedure 'Release 408' is invoked when the local system management entity within an interworking function requests the release of the CID associated with a particular AAL2 channel.

The Terminating procedure 'Assign' 410 is invoked when the system management entity within the distant peer interworking function requests the assignment of an AAL2 channel identifier (CID) to a particular AAL2 connection. The Terminating procedure 'Release 411' is invoked when the system management entity within the distant peer interworking function requests the release of the CID associated with a particular AAL2 channel.

It will be understood by those skilled in the art that both first interworking function 301 and second interworking function 302 are each configurable to generate Originating procedures and Terminating procedures.

Within the ANP layer management entity 304 there is a third functional block referred to herein as "Status Record" 412. Status Record 412 comprises a memory and processor resource configurable to store a plurality of numbers identifying a plurality of AAL2 channels associated with a single ATM VCC. In addition, Status Record 412 is configured to store information indicating whether an individual AAL2 channel amongst the plurality of AAL2 channels is in use. According to the best mode described herein, a single ATM VCC can carry up to 256 different AAL2 channels. The limit on the number of channels per ATM VCC is imposed by the size of an addressing field appended to each block of data by the Common Part Sub-layer function layer 202. On any ATM VCC a part of the bandwidth assigned to any individual AAL2 channel is concerned with identifying that channel. An AAL2 channel is identified by a channel identifier (CID). In order to ensure that each AAL2 channel within an ATM VCC has a unique identifier there is only one Status Record 412 per ATM VCC. However, there may be a plurality of Originating procedures 406 and a plurality of Terminating procedures 409 per ATM VCC. In addition, a plurality of ATM VCC's can share a single set of Originating plus Terminating procedures.

In order to create a new AAL2 channel between first and second interworking functions 301 and 302, System Management layer entity 303 exchanges a sequence of primitives with ANP layer management entity 304. If, by way of example, System Management layer entity 303 indicates that there is a need for a new AAL2 channel then the Originating procedures 406 within the ANP layer management entity interrogate Status Record means 412 to obtain an unassigned CID value. In order to establish an AAL2 channel between interworking functions 301 and 302 it is necessary that both interworking functions have knowledge of the CID value assigned to a channel prior to establishing that channel. To accomplish this the ANP layer management entity 304 institutes an exchange of messages with ANP layer management entity 316 associated with interworking function 302. The process of assigning a particular CID value to an AAL2 channel between interworking functions 301 and 302 is a service which the ANP layer management entities 304 and 316 provides for the corresponding System Management layer entities 303 and 318. The provision of services between peer ANP layers involves the exchange of ANP messages between ANP transmitting (Tx) and receiving (Rx) entities. As described herein the phrase "peer ANP layers" means separate and equivalent ANP layer management entities within separate interworking functions. The list of services provided by the ANP layer 304 to the System Management layer 303 comprises:

AAL2 channel assignment—establishes an AAL2 channel between peer ANP transmitting and ANP receiving layer management entities. Included among the parameters that are negotiated and/or conveyed between transmitting and receiving ANP layer management entities are the following: CID; and TransactionID which is used to associate a current transaction with a request from a System Management layer entity to establish a new AAL2 channel.

AAL2 channel release—this service is used to release a currently assigned AAL2 channel and to de-allocate the CID value identifying the assigned AAL 2 channel.

AAL2 channel pre-assignment—this service allows AAL2 channels to be pre-assigned for particular users.

Figure 5:
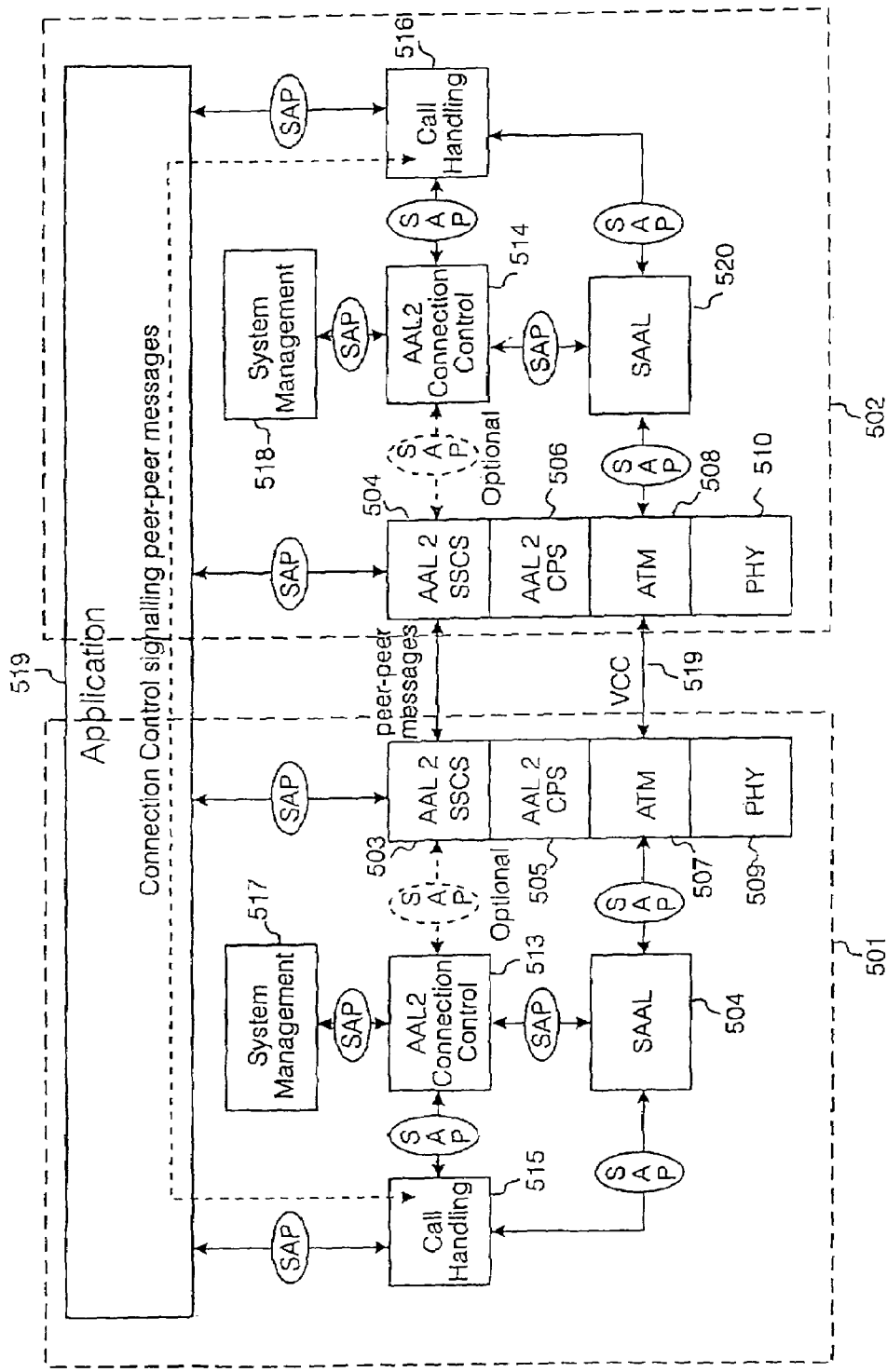
FIG. 5 illustrates schematically functional blocks within a pair of interworking functions and according to a second specific implementation of the present invention.

Referring to FIG. 5 herein there is illustrated schematically a second specific implementation according to the present invention. FIG. 5 illustrates a method of establishing a plurality of AAL2 channels across a single ATM VCC between first and second interworking functions 501 and 502. Each interworking layer comprises a protocol stack comprising a service specific convergence sub-layer 503, 504, a common part sub-layer 505, 506 an ATM layer 507, 508 and a physical layer 509, 510; a signaling ATM adaptation layer (SAAL) 504, 520 connected via a corresponding respective service access point to said ATM layer 507, 508; an AAL2 connection control block 513, 514 connected to said signaling ATM adaptation layer via a corresponding service access point; a call handling block 515, 516 communicating with said AAL2 connection control and said SAAL via corresponding service access points, and optionally communicating with said service specific convergence sub-layer 503, 504 via a corresponding service access point; and a system management layer 517, 518 communicating with said AAL2 connection control block via a further service access point. The call handling blocks communicate with each other via a connection control application 519 which carries peer to peer signalling messages. The service specific convergence sublayers communicate with the application services (voice, data) represented by application block 519. AAL2 connection control (AAL2 CC) 513 which is also known herein as ANP layer management entity communicates with the ATM layer 507 of the protocol stack via a Signaling ATM Adaption Layer (SAAL) 504. Communication between AAL2 Connection Control 513 and SAAL 504 is achieved through the exchange of a set of primitives across a service access point (SAP). Communication between SAAL 504 and ATM layer 507 is achieved by exchange of a set of primitives across another service access point.

Figures 6, 7:
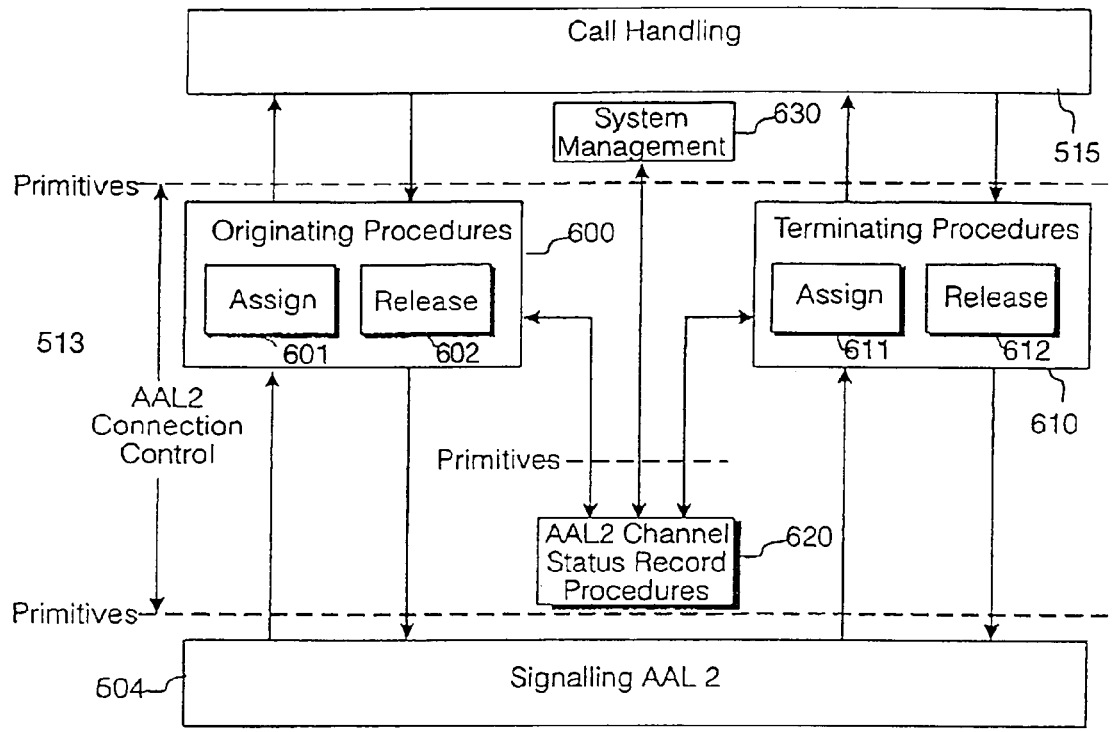
FIG. 6 illustrates schematically, in more detail, functional blocks within an AAL2 Connection Control.
FIG. 7 illustrates, by way of example, a Table used to store information concerning whether an individual AAL2 connection within one ATM virtual channel is assigned/unassigned or activated/de-activated.

Referring to FIG. 6 herein, there are illustrated schematically a set of functional blocks within AAL2 Connection Control 513 according to the second specific implementation of the present invention. AAL2 Connection Control 513 is subdivided into a set of functional blocks comprising a plurality of Originating procedures 600, Terminating procedures 610 and AAL2 Channel Status Record procedures 620. The Originating procedures 600 are invoked when a local Call Handling entity 515 originates either a CID assignment to establish a new AAL2 channel between interworking functions 501 and 502 or a CID release to release an AAL2 channel between interworking functions 501 and 502 which had been previously assigned. Terminating procedures 610 are invoked when call handling entity 515 within distant interworking function 502 originates either a CID assignment or a CID release. The AAL2 Channel Status Record procedures 620 are responsible for keeping a record of the status of individual CID values. AAL2 Channel Status Record procedures may be updated and queried by System Management entity 630 by the exchange of a set of primitives according to the best mode presented herein.

Call handling entity 515 is configured to send primitives to AAL2 Connection Control 513 that are responsible for assigning a CID value and releasing a CID value. In response to the primitives received from Call Handling 515 the AAL2 Connection Control 513 is configured to respond with primitives that confirm or deny the requests that Call Handling 515 makes. The primitives and parameters exchanged between AAL2 connection control 513 and call handling entity 515 are listed in Table 2.

TABLE 2

| Primitive Generic Name | Type | | | |
| --- | --- | --- | --- | --- |
| | Request | Indication | Response | Confirm |
| Assign | TransactionID Conn_Parms Routing_Info | TransactionID CID Conn_Parms Routing_Info | TransactionID CID | TransactionID CID |
| Reject | (Note 1) | TransactionID CID Cause | TransactionID CID Cause | (Note 1) |
| Release | TransactionID CID Cause | TransactionID CID Cause | TransactionID CID | TransactionID CID |
| Ready-for-Use | (Note 1) | CID TransactionID | (Note 1) | (Note 1) |
| Activate | CID Conn_Parms | CID Conn_Parms | CID | CID |
| Deactivate | CID | CID | CID | CID |

Note 1:
This primitive as not defined

The Routing_Info parameter is used in AAL2 switched connection control.

According to the best mode presented herein, a set of primitives are defined between the AAL2 Channel Status Record procedures 620 and System Management entity 630 to enable System Management entity 630 to control both the number of CIDs allocated and the number of CIDs pre-assigned as well as to determine the status of individual CIDs. The set of primitives that are exchanged between AAL2 Channel Status Record procedure 620 and System Management entity 630 are listed in Table 3 herein.

TABLE 3

| Primitive | Type | | |
| --- | --- | --- | --- |
| Generic Name | Request | Indication | Confirm |
| Preassign_CIDs | No_CID | | No_CID |
| Allocate_CIDs | No_CID Coll_Res | (Note 1) | No_CID Coll_Res |

TABLE 3-continued

| Primitive | Type | | |
|---|---|---|---|
| Generic Name | Request | Indication | Confirm |
| Query_CIDs | (Note 2) | No_CIDs | (Note 1) |
| Increment_CIDs | No_CID | (Note 1) | No_CID |
| Decrement_CIDs | No_CID | (Note 1) | No_CID |
| Status | CID | CID<br>CIDState | (Note 1) |

Note 1:
This primitive is not defined.
Note 2:
No parameter with this primitive.

The primitives listed in Table 3 herein are described as follows:
  Pre-assign_CIDs is used to allow a plurality of CID values to be semi-permanently associated with AAL 2 channels.
  Allocate_CIDs enables System Management entity 630 to set the number of CID values for use on ATM VCC 519;
  Query_CIDs enables System Management entity 630 to determine the number of currently assigned CID values;
  Increment_CIDs allows the number of allocatable CID values to be incremented;
  Decrement_CIDs allows the number of allocatable CID values to be decremented;
  Status allows the current state of a CID to be determined.

Preferably, the following parameters are defined for use with the primitives listed in Table 3 herein:
  CID indicates the CID value associated with the primitive;
  Coll_Res carries a value of either TRUE or FALSE. If Coll_Res has a value TRUE then the originating assignment of allocated CID values will start from the lowest available value towards the highest; if Coll_Res has a value FALSE then originating assignment will start from the highest available value towards the lowest;
  No_CID is used to indicate the number of CID values associated with is the primitive; and
  CIDState is used to indicate the current value of the CID for which status request has been received. CIDstate can only have two possible values, either assigned or unassigned.

In the best mode herein, primitives are defined to be exchanged between AAL2 Connection Control Originating procedures 600 and Terminating procedures 610 and AAL 2 Channel Status Record procedures 620 to control a current state of a given CID value. The primitives exchanged between AAL2 connection control Originating procedures 600 and Terminating procedure 610 and AAL2 Channel Status Record procedure 620 are listed in Table 4 herein:

TABLE 4

| Primitive | Type | |
|---|---|---|
| Generic Name | Request | Indication |
| Assign_CID | (Note 2) | CID |
| Activate_CID | CID | (Note 1) |
| Reject_CID | (Note 1) | Cause |

TABLE 4-continued

| Primitive | Type | |
|---|---|---|
| Generic Name | Request | Indication |
| Release_CID | CID | (Note 1) |
| Deactivate_CID | CID | (Note 1) |

Note 1:
This primitive is not defined
Note 2:
CID parameter only used for terminating assignment and not for originating assignment.

Preferably, the following parameters are defined for use with primitives listed in table 4:
  CID indicated CID value for the AAL 2 channel to be assigned/activated or released/deactivated; and
  Cause is used with reject_CID.indication primitive to convey to AAL2 Connection Control that, due to unavailability, request for CID assignments cannot be met.

Referring to FIG. 7 herein, there is illustrated, by way of example, a Status Record containing 256 AAL2 channel identifiers. According to the best mode presented herein, it is possible to semi-permanently assign certain CID values to particular applications. Semi-permanently assigned connections are also known as preassigned AAL 2 channels. Referring to FIG. 7, the contiguous set of AAL2 channels numbered 230–240 have been pre-assigned. When any of pre-assigned AAL2 channels 230–240 are in use they are activated, and when not in use they are de-activated. In contrast, other channels comprising one ATM VCC are assigned when in use and unassigned when not in use.

Figure 8:
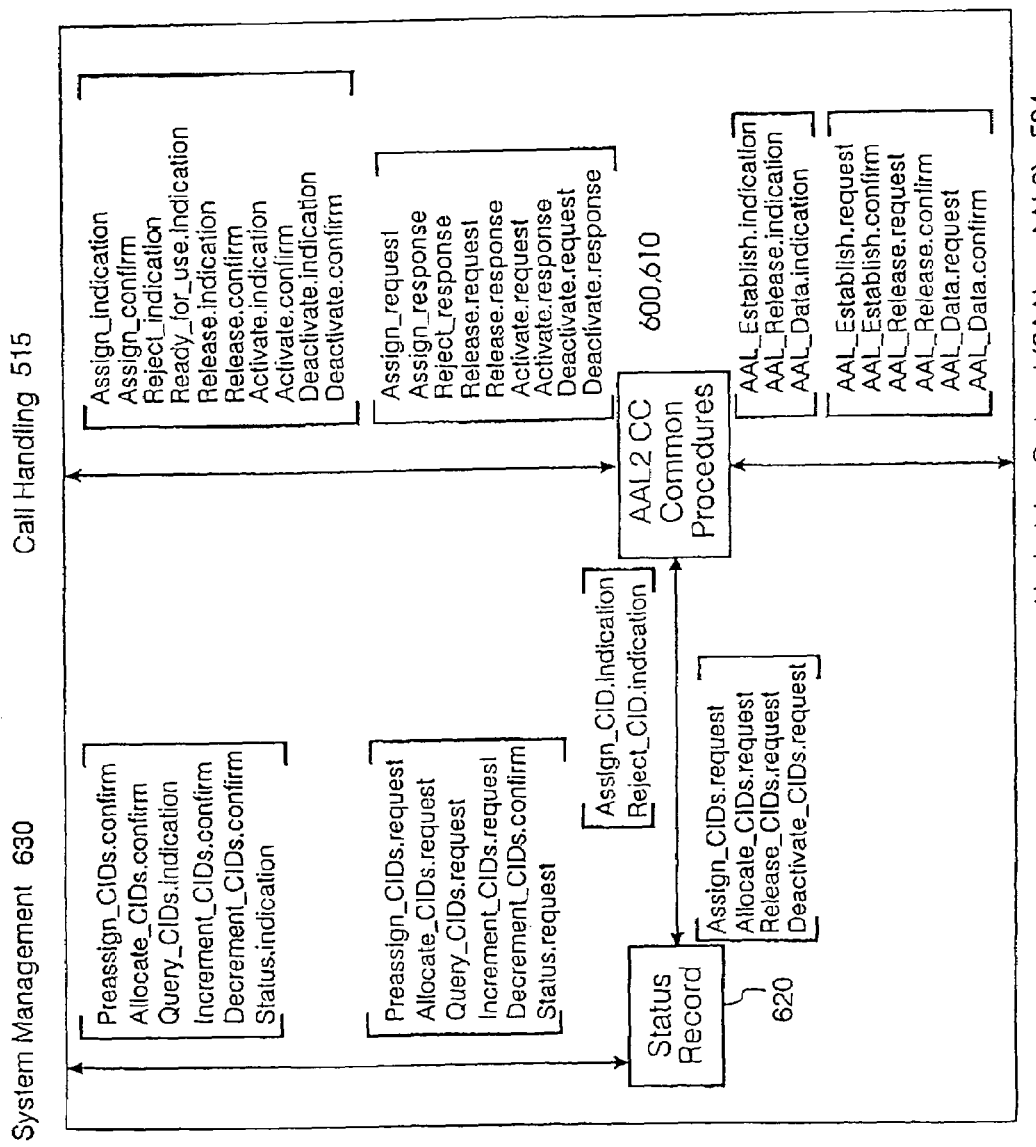
FIG. 8 lists a set of primitives exchanged between a System Management means, a Status Record means, AAL2 Connection Control means, Call Handing means and either a signaling ATM adaptation layer (SAAL) or AAL2.

Referring to FIG. 8 herein, there is illustrated schematically the sets of primitives exchanged between System Management 630, AAL2 Channel Status Record procedures 620, AAL2 Connection Control procedures 600 and 610, Call Handling 515 and the underlying protocol SAAL 504 according to a second method of the present invention.

Figure 9:
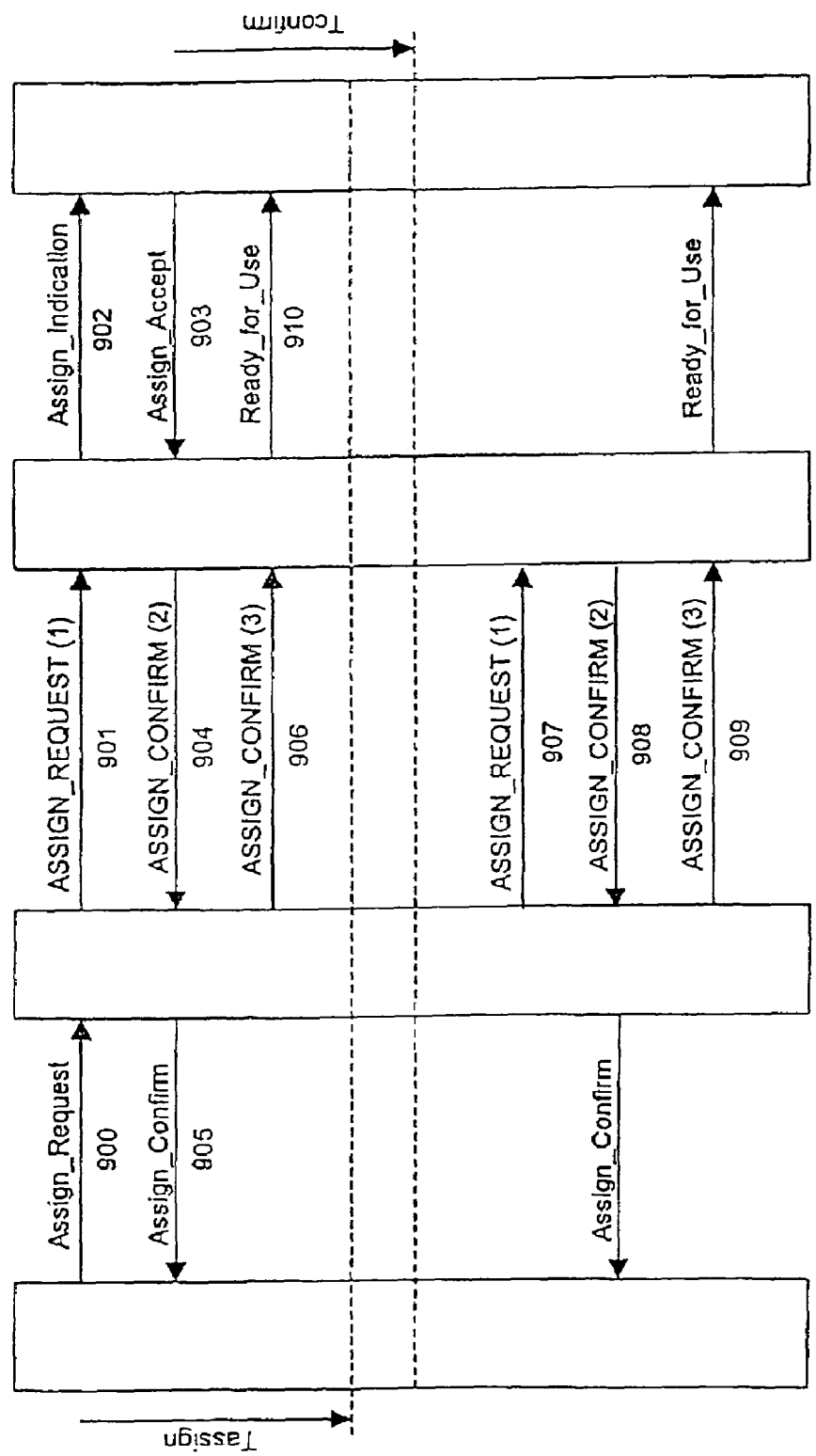
FIG. 9 illustrates, by way of example, a message sequence chart for establishing an AAL2 connection between first and second interworking functions and according to the first specific implementation of the present invention.

Referring to FIG. 9 herein, there is illustrated an example of a message sequence chart illustrating the primitives exchanged between functional blocks within interworking functions 301 and 302 and messages exchanged between corresponding functional blocks of interworking functions 301 and 302 during an attempt to assign a new AAL2 channel in the first implementation herein. Operation in the second implementation is similar.

System Management entity 303 sends an Assign_Request primitive 900 to transmitting ANP layer 304. Transmitting ANP layer management entity 304 responds by sending a first message ASSIGN_REQUEST (1) 901 to receiving ANP layer management entity 316 within distant interworking function 302. At substantially a same instant of time that ANP layer 304 sends the message to receiving ANP layer management entity 316, transmitting ANP layer management entity 304 also starts a first timing means called Tassign. If receiving ANP layer management entity 316 receives ASSIGN_REQUEST (1) message 901 then receiving ANP layer management entity 316 sends an Assign_Indication primitive 902 to System Management layer entity 318. System Management layer entity 318 responds by sending an Assign_Accept primitive 903 to receiving ANP layer management entity 316. Receiving ANP layer 316 responds by sending an ASSIGN_CONFIRM (2) message 904 to transmitting ANP layer 304, while at substantially the same time also starting a second timing means called Tconfirm. If the time duration between transmitting ANP layer 304 sending the ASSIGN_REQUEST (1) message and receiving the ASSIGN_CONFIRM (2) message is less than a pre-determined value Tassign then transmitting ANP layer management entity 304 responds by sending an Assign_Confirm primitive 905 to System Management layer entity 303 and sends ASSIGN_CONFIRM (3) message 906 to receiving ANP layer management entity 316. Preferably, the first pre-determined time Tassign is equal to 200 ms.

If receiving ANP layer 316 receives ASSIGN_CONFIRM (3) message 906 within a time less than predetermined value Tconfirm then receiving ANP layer 316 sends a Ready_for_Use primitive 910 to System Management layer entity 318 and a new AAL2 channel is successfully established. Preferably, the second pre-determined time duration Tconfirm is 200 ms. If receiving ANP layer 316 does not receive ASSIGN_CONFIRM (3) message 906 within the pre-determined time Tconfirm then it is inferred that transmitting ANP layer 304 has sent ASSIGN_CONFIRM (3) message 906 which has been corrupted in transmission. Receiving ANP layer 316 sends a Ready_for_Use primitive to System Management layer entity 318 and a new AAL2 channel is successfully established.

If transmitting ANP layer management entity 304 does not receive the ASSIGN_CONFIRM (2) message 904 within the first pre-determined time, Tassign then it sends another ASSIGN_REQUEST (1) message 907 to receiving ANP layer 316 and restarts timing means Tassign. If receiving ANP layer 316 receives another ASSIGN_REQUEST (1) message 907 after having sent ASSIGN_CONFIRM (2) message then it can be inferred that transmitting ANP layer management entity 304 did not receive ASSIGN_CONFIRM (2) message 904 within the predetermined time Tassign. In that case, receiving NP layer 316 then resends ASSIGN_CONFIRM (2) message 908 and restarts second timing means. If transmitting ANP layer management entity 304 receives the ASSIGN_CONFIRM (2) message 908 within the first pre-determined time Tassign then it sends an Assign_Confirm primitive to System management layer entity 303 and sends ASSIGN_CONFIRM (3) message 909 to receiving ANP layer 316. If receiving ANP layer 316 receives ASSIGN_CONFIRM (3) message 909 within time Tconfirm then receiving ANP layer 316 sends a Ready_for_Use primitive to System Management layer entity 318 and a new AAL2 channel is successfully established. If receiving ANP layer 316 does not receive ASSIGN_CONFIRM (3) message 909 within the second pre-determined time Tconfirm then it is inferred that transmitting ANP layer 304 has sent ASSIGN_CONFIRM (3) message 909 which has been corrupted in transmission. Receiving ANP layer 316 sends a Ready_for_Use primitive to System Management layer entity 318 and a new AAL2 channel is successfully established.

The use of timing means Tassign and Tconfirm for the retransmission of messages that are lost or corrupted during transmission may be invoked as many times as required to ensure satisfactory message delivery. Thus, the signaling method described herein before for establishing a new AAL2 connection between interworking functions is sufficiently robust to withstand the loss of individual messages used in assigning a new AAL2 channel.

Figure 10:
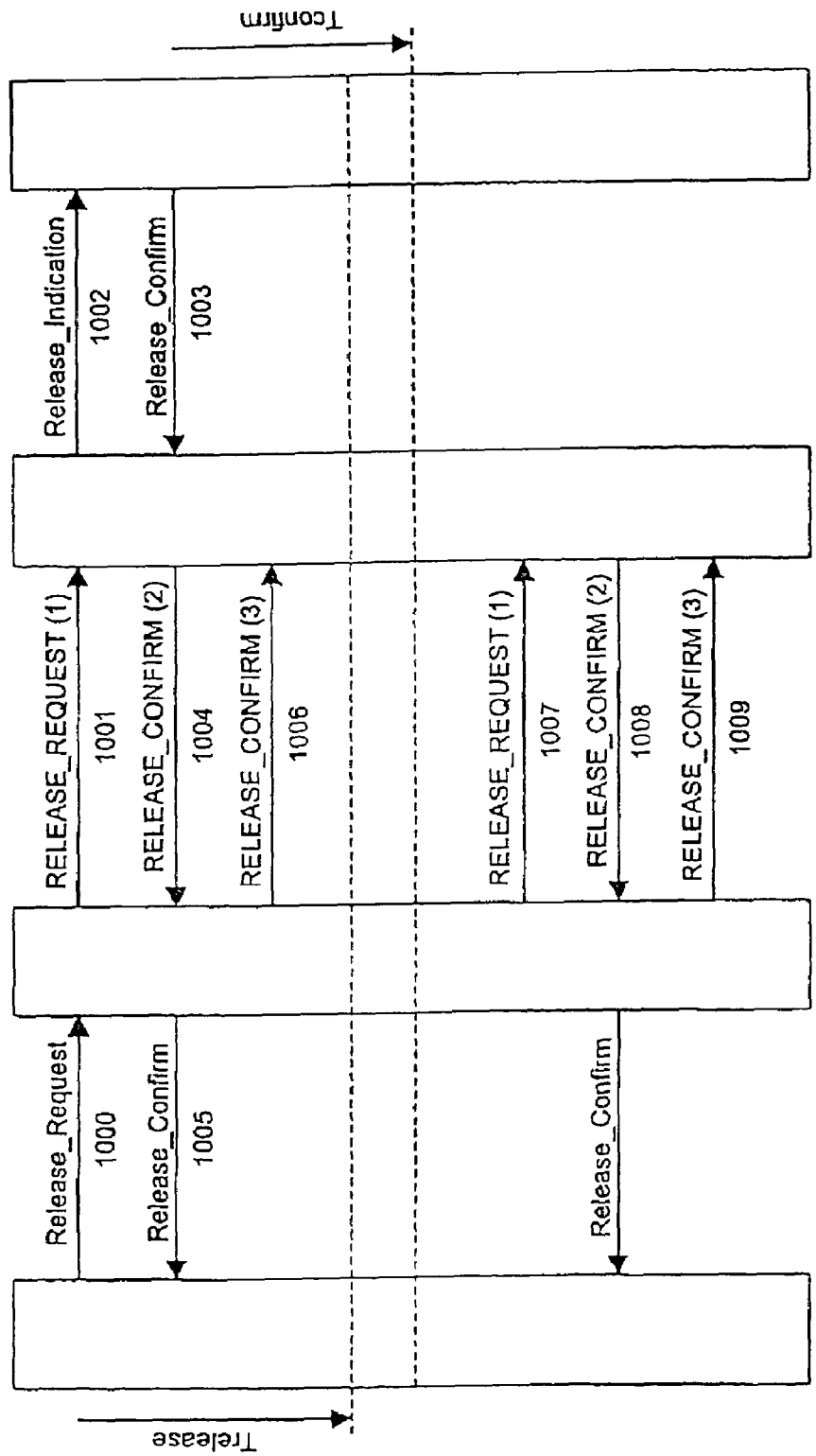
FIG. 10 illustrates schematically message sequences for releasing an AAL2 connection between first and second interworking functions according to a second specific implementation of the present invention.

Referring to FIG. 10 herein, in a like manner, when a previously established AAL2 channel is no longer required system Management entity 303 sends a Release_Request primitive 1000 to transmitting ANP layer management entity 304. Transmitting ANP layer management entity 304 responds by sending a first message RELEASE_REQUEST (1) 1001 to receiving ANP layer management entity 316 within distant second interworking function 302. At substantially the same instant of time that ANP layer management entity 304 sends a message to receiving ANP layer management entity 316 transmitting ANP layer management entity 304 also starts a third timing means called Trelease. If receiving ANP layer management entity 316 receives first RELEASE_REQ (1) message 1001 then receiving ANP layer management entity 316 sends a Release_Indication primitive 1002 to system management layer entity 318. System management layer entity 318 responds by sending a Release_Confirm primitive 1003 to receiving ANP layer management entity 316. Receiving ANP layer management entity 316 responds by sending a first RELEASE_CONFIRM (2) message 1004 to transmitting ANP layer management entity 304, while at substantially the same time starting said second timing means Tconfirm. If the time duration between transmitting ANP layer management entity 304 sending RELEASE_REQ (1) message 1001 and receiving the RELEASE_CONFIRM (2) message 1004 is less than a third pre-determined value Trelease then transmitting ANP layer management entity 304 responds by sending a Release_Confirm primitive 1005 to system management layer entity 303 and sends RELEASE_CONFIRM (3) message 1006 to receiving ANP layer management entity 316. Preferably, the third pre-determined time Trelease has a value of 200 ms. The channel identifier associated with the AAL2 channel is set to unassigned within Status Record 412 and the released AAL2 channel is now, once again, available for use.

If receiving ANP layer 316 receives RELEASE_CONFIRM (3) message 1006 within a time less than predetermined value Tconfirm then the channel identifier associated with the AAL2 channel is set to unassigned within Status Record 412 and the released AAL2 channel is now, once again, available for use. If receiving ANP layer 316 does not receive RELEASE_CONFIRM (3) message 1006 within the pre-determined time Tconfirm then it is inferred that transmitting ANP layer 304 has sent RELEASE_CONFIRM (3) message 1006 which has been corrupted in transmission. As before, the channel identifier associated with the AAL2 channel is set to unassigned within Status Record 412 and the released AAL2 channel is now, once again, available for use.

If transmitting ANP layer management entity 304 does not receive first RELEASE_CONFIRM (2) message 1004 within the third pre-determined time, Trelease then sends a second RELEASE_REQ (1) message 1007 to receiving ANP layer management entity 316. If receiving ANP layer management entity 316 receives a second RELEASE_REQ (1) message 1007 after having sent first RELEASE_CONFIRM (2) message 1004 then it can be inferred that transmitting ANP layer management entity 304 did not receive RELEASE_CONFIRM (2) message 1004. In that case, receiving ANP layer management entity 316 then sends a second RELEASE_CONFIRM (2) message 1008 and restarts the second timing means which stores a time duration Tconfirm. Transmitting ANP layer management entity 304 if it receives second RELEASE_CONFIRM (2) message 1008, then sends a Release_Confirm primitive 1010 to system management entity 303 and sends RELEASE_CONFIRM (3) message 1009 to receiving ANP layer management entity 316 and the channel identifier associated with the AAL2 channel is set to unassigned within Status Record 412 and the released AAL2 channel is now, once again, available for use.

If receiving ANP layer management entity 316 receives RELEASE_CONFIRM (3) message 1009 within the second pre-determined time Tconfirm then the channel identifier associated with the AAL2 channel is set to unassigned within Status Record 412 and the released AAL2 channel is now, once again, available for use. If receiving ANP layer management entity 316 does not receive RELEASE_CONFIRM (3) message 1009 within the second pre-determined time Tconfirm, then it is inferred that transmitting ANP layer 304 has sent RELEASE_CONFIRM (3) message 1009 which has been corrupted in transmission. In this case, receiving ANP layer management entity 316 sets the channel identifier associated with the AAL2 channel to unassigned exactly as before. The use of timing means Trelease and Tconfirm for the retransmission of messages that are lost or corrupted during transmission may be invoked as many times as required to ensure satisfactory message delivery.

What is claimed is:

1. A method of assigning an asynchronous transfer mode (ATM) adaptation layer 2 (AAL2) channel on an ATM virtual channel connection (VCC) between first and second communications entities, said method comprising the steps of:
   maintaining at each of said entities stored records of a plurality of channel identifiers (CIDs) relating to a plurality of AAL2 channels associated with said ATM VCC; and
   exchanging messages between said first and second communication entities,
   wherein, at each of said first and second communications entities, said exchanged messages operate on said stored records to modify a status information for an AAL2 channel to indicate that said AAL2 channel has been assigned for use on said VCC and wherein, after said messages have operated on said stored records of CIDs, the stored records for said ATM VCC at each of the entities are identical.

2. A method as claimed in claim 1, wherein the stored records of the plurality of channel identifiers (CIDs) relating to the plurality of AAL2 channels associated with said ATM VCC comprises status records for each AAL2 channel of the ATM VCC stored at each communications entity in a memory resource thereof.

3. A method as claimed in claim 2, wherein the memory resource has a processor associated therewith for processing a status record of an AAL2 channel of the ATM VCC identified in the messages exchanged between the communications entities.

4. A method as claimed in claim 3, wherein each of the predefined messages contains at least one parameter which is assigned a value when said predefined message is used by a management function to establish the messages to be exchanged between said entities.

5. A method as claimed in claim 4, wherein the at least one parameter contained in each of said predefined messages comprise at least one of a CID value for the AAL2 channel to be assigned/released, a connection parameter for configuring the AAL2 channel, a cause parameter and a transaction identity parameter.

6. A method as claimed in claim 5, wherein the connection parameter configures a voice encoding of the AAL2 channel.

7. A method as claimed in claim 5, wherein said cause parameter is used with any one of a reject, release and fault predefined message to indicate a reason for any of an AAL2 channel CID assignment rejection, release and fault indication.

8. A method as claimed in claim 5, wherein the transaction identity parameter is used to associate a current transaction with a given call between users on the ATM VCC.

9. A method as claimed in claim 1, wherein it includes the further step of releasing an AAL2 channel from said VCC by exchanging messages between said first and second entities, wherein, at each of said entities, said messages operate on said stored records to modify a status information for an AAL2 channel to indicate that said AAL2 channel has been released from use on said VCC and wherein, after said messages have operated on said stored records of CIDs, the stored records for said ATM VCC at each of the entities are identical.

10. A method as claimed in claim 1, wherein each of the first and second communications entities includes a system management function which employs predefined sets of messages to establish the messages to be exchanged between said entities.

11. A method as claimed in claim 10, wherein each of the first and second communications entities includes a layer management function for controlling an ATM protocol stack of said ATM VCC, said layer management functions each employing predefined sets of messages exchanged with its respective system management function to establish the messages to be exchanged between said first and second communications entities.

12. A method as claimed in claim 11, wherein said layer management functions are each arranged to implement originating procedures whereby when the system management function of a communication entity requests assignment of an AAL2 CID, the layer management function invokes an assignment procedure from its originating procedures.

13. A method as claimed in claim 12, wherein when the system management function of the communication entity requests release of an AAL2 CID, the layer management function invokes a release procedure from its originating procedures.

14. A method as claimed in claim 12, wherein said layer management function of the first communications entity is arranged to implement terminating procedures whereby when the system management function of the second communications entity requests assignment of an AAL2 CID, the layer management function of the first communications entity invokes an assignment procedure from its terminating procedures.

15. A method as claimed in claim 14, wherein when the system management function of the second communication entity requests release of an AAL2 CID, the layer management function of the first communications entity invokes a release procedure from its terminating procedures.

16. A method as claimed in claim 1, wherein the messages exchanged between the first and second communications entities comprise peer to peer messages.

17. A method as claimed in claim 16, wherein the peer to peer messages comprise messages exchanged between respective service specific convergence sub-layers of the first and second communications entities.

18. A method as claimed in claim 1, wherein at least one AAL2 channel of the ATM VCC is identified in the stored records as being pre-assigned.

19. A method as claimed in claim 1, wherein the first and second communications entities each comprise a communications switch.

20. A method as claimed in claim 1, wherein the step of exchanging messages between said first and second communications entities comprises:

generating a plurality of originating procedure messages for creating a plurality of AAL2 channels;

generating a plurality of terminating procedure messages complementary to the originating procedure messages for creating a plurality of AAL2 channels;

generating a plurality of originating procedure messages for releasing a plurality of AAL2 channels; and generating a plurality of terminating procedure messages complementary to the originating procedure messages for releasing a plurality of AAL2 channels.

21. A method of communicating a plurality of AAL2 channels over a single ATM virtual channel connection (VCC), said method comprising the steps of:

storing a plurality of records describing a status of a plurality of AAL2 channel identifiers (CIDs);

generating a set of messages operating on said stored CID records;

generating a plurality of originating procedure messages for creating a plurality of AAL2 channels;

generating a plurality of terminating procedure messages complementary to the originating procedure messages for creating a plurality of AAL2 channels;

generating a plurality of originating procedure messages for releasing a plurality of AAL2 channels; and generating a plurality of terminating procedure messages complementary to the originating procedure messages for releasing a plurality of AAL2 channels.

22. A method as claimed in claim 21, wherein the stored CID records of the ATM VCC are stored at each communications entity in a memory resource thereof.

23. A method as claimed in claim 22, wherein the memory resource has a processor associated therewith for processing a CID record of an AAL2 channel of the ATM VCC identified in the generated messages.

24. A method as claimed in claim 21, wherein the ATM VCC connects first and second communications entities, each of said entities including a system management function which employs predefined sets of messages to generated the messages to be exchanged between said entities.

25. A method as claimed in claim 24, wherein each of the predefined messages contains at least one parameter which is assigned a value when said predefined message is used by a management function to generate the messages to be exchanged between said entities.

26. A method as claimed in claim 25, wherein the at least one parameter contained in each of said predefined messages comprise at least one of a CID value for the AAL2 channel to be assigned/released, a connection parameter for configuring the AAL2 channel, a cause parameter and a transaction identity parameter.

27. A method as claimed in claim 26, wherein the connection parameter configures a voice encoding of the AAL2 channel.

28. A method as claimed in claim 26, wherein said cause parameter is used with any one of a reject, release and fault predefined message to indicate a reason for any of an AAL2 channel CID assignment rejection, release and fault indication.

29. A method as claimed in claim 26, wherein the transaction identity parameter is used to associate a current transaction with a given call between users on the ATM VCC.

30. A method as claimed in claim 24, wherein each of the first and second communications entities includes a layer management function for controlling an ATM protocol stack of said ATM VCC, said layer management functions each employing predefined sets of messages exchanged with its respective system management function to generate the messages to be exchanged between said first and second communications entities.

31. A method as claimed in claim 32, wherein said layer management functions are each arranged to implement originating procedures whereby when the system management function of a communication entity requests assignment of an AAL2 CID, the layer management function invokes an assignment procedure from its originating procedures to generate the originating procedures messages for creating a plurality of AAL2 channels.

32. A method as claimed in claim 31, wherein when the system management function of the communication entity requests release of an AAL2 CID, the layer management function invokes a release procedure from its originating procedures to generate the originating procedures messages for releasing a plurality of AAL2 channels.

33. A method as claimed in claim 31, wherein said layer management function of the first communications entity is arranged to implement terminating procedures whereby when the system management function of the second communications entity requests assignment of an AAL2 CID, the layer management function of the first communications entity invokes an assignment procedure from its terminating procedures to generate the terminating procedures messages for creating a plurality of AAL2 channels.

34. A method as claimed in claim 33, wherein when the system management function of the second communication entity requests release of an AAL2 CID, the layer management function of the first communications entity invokes a release procedure from its terminating procedures to generate the terminating procedures messages for releasing a plurality of AAL2 channels.

35. A method as claimed in claim 21, wherein the generated messages comprise peer to peer messages.

36. A method as claimed in claim 35, wherein the peer to peer messages comprise messages exchanged between respective service specific convergence sub-layers of respective communications entities.

37. A method as claimed in claim 21, wherein at least one AAL2 channel of the ATM VCC is identified in its CID record as being pre-assigned.

38. A method as claimed in claim 21, wherein the first and second communications entities each comprise a communications switch.

39. A system for assigning an asynchronous transfer mode (ATM) adaptation layer 2 (AAL2) channel on an ATM virtual channel connection (VCC) between first and second communications entities, said system comprising:

a memory at each of said entities for storing records of a plurality of channel identifiers (CIDs) relating to a plurality of AAL2 channels associated with said ATM VCC;

a system management function at each of said entities for exchanging messages, and a processor at each of said entities for processing said exchanged messages to modify a status information contained in a stored record for an AAL2 channel to indicate that said AAL2 channel has been assigned for use on said VCC, wherein, after said messages have been processed to modify the status information for said AAL2 channel, the stored records for said ATM VCC at each of the entities are identical.

40. A communications entity for assigning an asynchronous transfer mode (ATM) adaptation layer 2 (AAL2) channel on an ATM virtual channel connection (VCC)

between said entity and a second communication entity, said communications entity comprising:
- a memory for storing records of a plurality of channel identifiers (CIDs) relating to a plurality of AAL2 channels associated with said ATM VCC;
- a system management function for exchanging messages with a system management of the second entity, and
- a processor for processing said exchanged messages to modify a status information contained in a stored record for an AAL2 channel to indicate that said AAL2 channel has been assigned for use on said VCC,
- wherein the communications entity shares the stored records for said ATM VCC with the second communications entity.

41. A system for communicating a plurality of AAL2 channels over a single ATM virtual channel connection (VCC), said system comprising:
- a memory for storing a plurality of records describing a status of a plurality of AAL2 channel identifiers (CIDs); and
- a processor for generating a set of messages operating on said stored CID records; generating a plurality of originating procedure messages for creating a plurality of AAL2 channels; generating a plurality of terminating procedure messages complementary to the originating procedure messages for creating a plurality of AAL2 channels; generating a plurality of originating procedure messages for releasing a plurality of AAL2 channels; and generating a plurality of terminating procedure messages complementary to the originating procedure messages for releasing a plurality of AAL2 channels.

42. An interworking function for a communications entity, said interworking function being provided for assigning an asynchronous transfer mode (ATM) adaptation layer 2 (AAL2) channel on an ATM virtual channel connection (VCC) between said communications entity and a second communication entity, said interworking function comprising:
- a memory for storing records of a plurality of channel identifiers (CIDs) relating to a plurality of AAL2 channels associated with said ATM VCC;
- a system management function for exchanging messages with a system management of the second entity, and
- a processor for processing said exchanged messages to modify a status information contained in a stored record for an AAL2 channel to indicate that said AAL2 channel has been assigned for use on said VCC,
- wherein the interworking function shares the stored records for said ATM VCC with an interworking function of the second communications entity.

43. An interworking function as claimed in claim 42, wherein the function is realised as an application specific integrated circuit (ASIC).

44. An interworking function as claimed in claim 42, wherein said function is embodied in computer program code stored in a memory of the communications entity and is implemented through execution of said program code in a processor of the communications entity.

45. A machine readable medium storing computer program code executable in a processor of a communications entity, the code being executable by the processor to perform the method of assigning an asynchronous transfer mode (ATM) adaptation layer 2 (AAL2) channel on an ATM virtual channel connection (VCC) between first and second communications entities, said program code including:
- code for maintaining at each of said entities stored records of a plurality of channel identifiers (CIDs) relating to a plurality of AAL2 channels associated with said ATM VCC; and
- code for exchanging messages between said first and second communication entities,
- wherein, at each of said first and second communications entities, said exchanged messages operate on said stored records to modify a status information for an AAL2 channel to indicate that said AAL2 channel has been assigned for use on said VCC and wherein, after said messages have operated on said stored records of CIDs, the stored records for said ATM VCC at each of the entities are identical.

46. A machine readable medium storing computer program code executable in a processor of a communications entity, the code being executable by the processor to perform the method of communicating a plurality of AAL2 channels over a single ATM virtual channel connection (VCC), said program code comprising:
- code for storing a plurality of records describing a status of a plurality of AAL2 channel identifiers (CIDs);
- code for generating a set of messages operating on said stored CID records;
- code for generating a plurality of originating procedure messages for creating a plurality of AAL2 channels;
- code for generating a plurality of terminating procedure messages complementary to the originating procedure messages for creating a plurality of AAL2 channels;
- code for generating a plurality of originating procedure messages for releasing a plurality of AAL2 channels; and
- code for generating a plurality of terminating procedure messages complementary to the originating procedure messages for releasing a plurality of AAL2 channels.

* * * * *